(12) United States Patent
LeCrone et al.

(10) Patent No.: US 6,874,046 B1
(45) Date of Patent: Mar. 29, 2005

(54) METHOD AND APPARATUS FOR ENHANCING ACCESS TO REDUNDANT DATA STORAGE FACILITIES

(75) Inventors: Douglas E. LeCrone, Hopkinton, MA (US); Paul A. Linstead, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 338 days.

(21) Appl. No.: 09/966,639

(22) Filed: Sep. 28, 2001

(51) Int. Cl.$^7$ .............................................. G06F 13/12

(52) U.S. Cl. ............................. 710/74; 710/5; 710/20

(58) Field of Search .............................. 710/5, 20, 74; 711/100, 111, 112; 709/213; 707/10, 204

(56) References Cited

U.S. PATENT DOCUMENTS

| | | | |
|---|---|---|---|
| 5,870,537 A | 2/1999 | Kern et al. | 395/182.04 |
| 6,092,066 A | 7/2000 | Ofek | 707/10 |
| 6,304,980 B1 * | 10/2001 | Beardsley et al. | 707/204 |
| 6,484,187 B1 * | 11/2002 | Kern et al. | 707/204 |
| 6,526,419 B1 * | 2/2003 | Burton et al. | 707/204 |

* cited by examiner

*Primary Examiner*—Kim Huynh
(74) *Attorney, Agent, or Firm*—George A. Herbster (57) ABSTRACT

A dynamic address switching system for use in a data processing system with redundant data storage facilities. A validation routine or module assures that dynamic switching can occur between logical devices. A swapping routine exchanges information in unit control blocks for logical devices in the redundant system thereby to enable I/O requests from a host to be redirected over another channel to the other data storage facility.

18 Claims, 9 Drawing Sheets

METHOD AND APPARATUS FOR ENHANCING ACCESS TO REDUNDANT DATA STORAGE FACILITIES

BACKGROUND OF THE INVENTION

1. Field of the Invention

This invention generally relates to data processing systems that incorporate redundant addressable data storage facilities and more specifically to a method and apparatus for enabling dynamic address switching that enhances the use of such redundant data storage facilities.

2. Description of Related Art

U.S. Pat. No. 6,092,066 granted Jul. 18, 2000 and assigned to the same assignee as this invention discloses a data network with a local system and a geographically remote system for providing redundant data storage. A local data processing system, often called a production system, includes a local data storage facility that stores a database and processed transactions or other applications that operate in that data. A second, or remote, system is physically separated from the local system and includes a remote data storage facility that normally mirrors the data in local data storage facility over a high-bandwidth communications link. The remote system also may include a host so the remote system can operate completely independently of the local system should a disaster occur at the site of the local system.

In addition, U.S. Pat. No. 6,092,066 discloses a method and apparatus by which the communications link can be interrupted to allow applications in the remote host system to act on the copy of the data concurrently with and independently of operations at the local production system. Each data storage facility records all data changes. Upon reestablishment of the communications link the recorded changes are combined to provide a basis for resynchronizing the data in the remote data storage facility to the data in the local data storage facility. In this system no communications occur directly between the local host system and the remote data storage facility. Rather, all data transfers occur over the high-bandwidth communications link.

More recently such systems have been modified by establishing a communications path, or channel, between a host system at a production facility and various components of the remote system, such as the remote data storage facility. Such communications paths or channels allow a direct transfer of a command or data from a local system to the remote system to provide greater flexibility in various operations. For example, load balancing used to even loading on different storage systems in a data processing system.

Physical storage devices in such data storage facilities organize data into logical volumes. A logical volume may be equal in size to one physical disk drive or to a portion of a physical disk drive, or a logical volume may extend over multiple physical storage devices. In a mirrored system both the local and remote data storage facilities, as shown in U.S. Pat. No. 6,092,066, contain copies of the same data in corresponding logical volumes. Data written to a logical volume at the local site is replicated to its corresponding logical volume at the remote site.

As is also known, the operating system for a host system contains various control mechanisms and control data structures that enable the I/O requests from a processor to control the operation of a data storage facility. In the MVS operating system supplied by IBM Corporation, these control structures include a unit control block (UCB) for each logical device in the system and corresponding device control extensions. In addition, a redundant system as shown in U.S. Pat. No. 6,092,066 includes a data structure that identifies each logical volume in the production data storage facility and the identity of the corresponding logical volume in the remote data storage facility.

This modified system could divert I/O requests to the remote data storage facility at an operator's discretion in a type of address switching. Specifically, there was an initial determination made to assure that the I/O request could be switched to a particular logical storage volume in the remote data storage facility. Then the data in the selected production logical volume unit control block was exchanged with the information in the corresponding remote data storage facility logical volume unit control block. I/O requests thereafter were directed to the logical volume in the remote data storage facility. In In this system each change made in the remote data storage facility logical volume was recorded. When it was desired to return to normal operations and transfer I/O requests from the local host system to the local data storage facility, a reverse operation occurred. The data in the corresponding UCBs was exchanged so that the data in each UCB returned to its original state.

This address switching capability provided certain operational enhancements. Address switching could produce limited load balancing by diverting some work load from the local data storage facility to the remote data storage facility. During maintenance and upgrades, I/O requests from the local host system could be diverted to the remote data storage facility while maintenance was underway.

However, this approach only allowed transfers to one specific logical volume at a time. If a particular physical disk drive included more than one logical volume, it became necessary to repeat the entire process for each logical volume to prevent data corruption by the maintenance operation.

While this address switching scheme provided maintenance and load balancing functions and enhancements, its implementation prevented any ready use with groups of logical volumes without difficulty. From a practical standpoint it was also not possible to respond to certain interruptions as might be caused by a problem with a specific physical drive or by failure of a connecting channel.

U.S. Pat. No. 5,870,537 granted in 1990 to Kern et al. discloses a concurrent switch to a shadowed device for storage controller and device errors. This system, like the previously described system, allows host directed I/O operations to be switched from a primary, or local, data storage device to a secondary, or remote, data storage device in a remote copy duplex pair. The secondary data storage device can be swapped with the primary data storage device by terminating the remote copy duplex pair and establishing an opposite direction remote copy duplex pair such that the secondary data storage device is a primary device of the duplex pair and the primary data storage device is a shadowing device. Application programs running in the primary host processor have a device address for the secondary storage device substituted as a device address of the primary data storage device.

This particular application of address switching is involved in I/O and error recovery programs. It allows the host with an error protection program to perform diagnosis and provide control for a single device. Like the modified system of U.S. Pat. No. 6,092,066, the program is directed primarily to swapping one logical volume at a time. Swapping multiple logical volumes is not proposed. Thus if I/O requests from a host are directed to several logical volumes, each time an error is recognized on one logical volume, that transfer and resulting address switching occurs only with respect to that logical volume. None of the other logical volumes are switched. Consequently the process must repeat each time to divert I/O requests to related redundant logical volumes. What is needed is a method and apparatus for enabling a host at one location to redirect I/O requests to a data storage facility at another location that relate to a plurality of logical volumes and to enable such transfers to made either at operator discretion or automatically in response to certain failures.

SUMMARY

Therefore it is an object of this invention to provide a method and apparatus for enhancing the address switching to control the transfer of I/O requests to one of two redundant data storage facilities.

Another object is to provide a method and apparatus for enhancing the handling of I/O requests to one of two redundant data storage facilities, particularly in the case of channel or storage facility failures.

Yet another object is to provide a method and apparatus for enhancing the handling of I/O requests to one of two redundant data storage facilities, particularly during maintenance operations.

Still another object is to provide a method and apparatus for enhancing the handling of I/O requests to one of two redundant data storage facilities, particularly for load balancing.

More specifically, this invention is directed to enhancing operations of a data processing system in which a processor can direct I/O requests over a first communications channel to a first plurality of logical devices or can direct I/O requests over a second channel to a second plurality of logical devices. The host normally directs I/O requests over the first channel and the second logical devices normally mirror the first logical devices. Each logical device has an identifying control block. The processor I/O requests use the control blocks to identify a specific logical device. In accordance with this invention, the operating validity of the first and second pluralities of logical storage devices are monitored to determine their operating validity independently of any address switching. When it is desired to initiate an address switch, the operating validity of the first and second pluralities of logical devices is verified. Information in each control block associated with the first plurality of logical devices is exchanged with information in each of the control blocks associated with the second plurality of logical devices. With one address switching operation, subsequent processing I/O requests to all of the first plurality of storage devices are redirected to the second plurality of logical devices.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
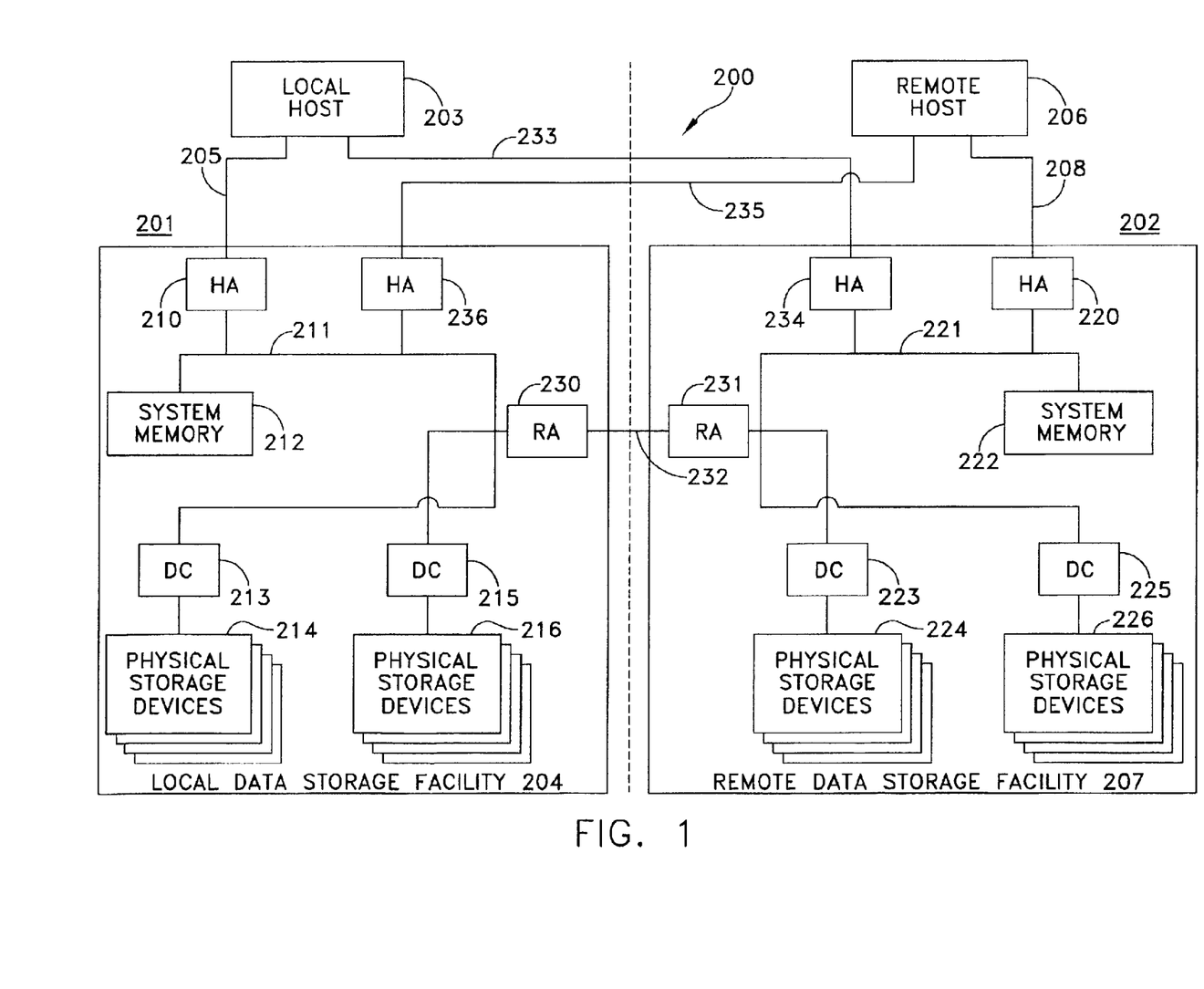
FIG. 1 is a block diagram of a data processing system with redundancy provided by a remote data processing system including local and remote hosts and data storage facilities.

By way of background for understanding this invention, FIG. 1 depicts a data processing network or arrangement 200 with systems at geographically diverse sites, namely: a local system site 201 and a remote system site 202. The local site 201 includes a local host 203 with a local storage controller or data storage facility 204. As known, the local host 203 communicates with the local data storage facility 204 through a channel 205. Operating systems for providing such communications including processor I/O requests are well known in the art. Similarly, the remote site 202 includes an optional remote host 206 with the capability of directing I/O requests to a remote data storage facility 207 through a channel 208. Each of the local and remote data storage facilities 204 and 207 comprises a disk array storage device.

The data storage facilities 204 and 207 can have many forms. For explaining this invention, each data storage facility is assumed to be a Symmetrix data storage facility available from the assignee of this invention. The specific data storage facilities, such as facilities 204 and 207, have similar structures. For example, the local data storage facility 204 includes a host adapter 210 that connects to the channel 205. The host adapter 210 also connects to a bus 211 that provides a communications path to a system memory 212 and two sets of physical disk drives shown as including a disk controller 213 with physical storage devices 214 and another disk controller 215 with physical storage devices 216.

Similarly, the remote data storage facility 207 has a host adapter 220 that connects between the channel 208 and a bus 221 that communicates with a system memory 222 and an array of physical storage devices through disk controllers such as a disk controller 223 connected to physical disk storage devices 224 and a disk controller 225 connected to physical disk storage devices 226.

As known, physical disk storage devices in such data storage facilities organize data in logical volumes. Each of the system memories 212 and 222 comprises a cache memory that includes a number of data structures including device headers. Each device header identifies a particular device including the structure of that device and a track table that identifies changes to data on a specific track in one device and corresponding tracks in related logical devices.

The system 200 shown in FIG. 1 includes a remote adapter 230 in the local data storage facility 204 and a remote adapter 231 in the remote data storage facility 207 interconnected with a separate communications path 232. This communications path 232, sometimes called a COMM link, is a high bandwidth path that may extend for up to thousand of miles and incorporate high-speed data transmission equipment, as known.

During normal mirroring operations an I/O request directed to the local data storage facility may request data to be stored in a logical device. The data is stored initially in the system memory 212. That data destages to an appropriate one of the physical storage devices 214 or 216 through the respective disk controllers 213 and 215. In addition, the remote adapter 230 transfers the data from the system memory 212 over the link 232 through the remote adapter 231 into the system memory 222. The remote data storage facility 207 then destages this data to the corresponding location in one of the sets of physical storage devices 224 and 226 through the device controller 223 and 225, respectively. The remote adapters 230 and 231 and communications link 232 can also be configured to transfer data from the remote data storage facility 207 to the local data storage facility 204.

FIG. 1 also depicts an additional set of communications paths or channels. A channel 233 extends from the local host 203 to a host adapter 234 in the remote data storage facility 207 that connects to the bus 221. Similarly, a channel 235 extends from the remote host 206 to a host adapter 236 in the local data storage facility 204 that attaches to the bus 211. As known, the channel 233 enables the local host 203 to transfer commands to the remote data storage facility 207 thereby to effect operations in that facility when needed. The channel 233 also allows the local host 203 to redirect I/O requests for one of the physical storage devices in the local data storage facility 204 to a physical storage device in the remote data storage facility 207 for maintenance and load balancing purposes.

Figure 2:
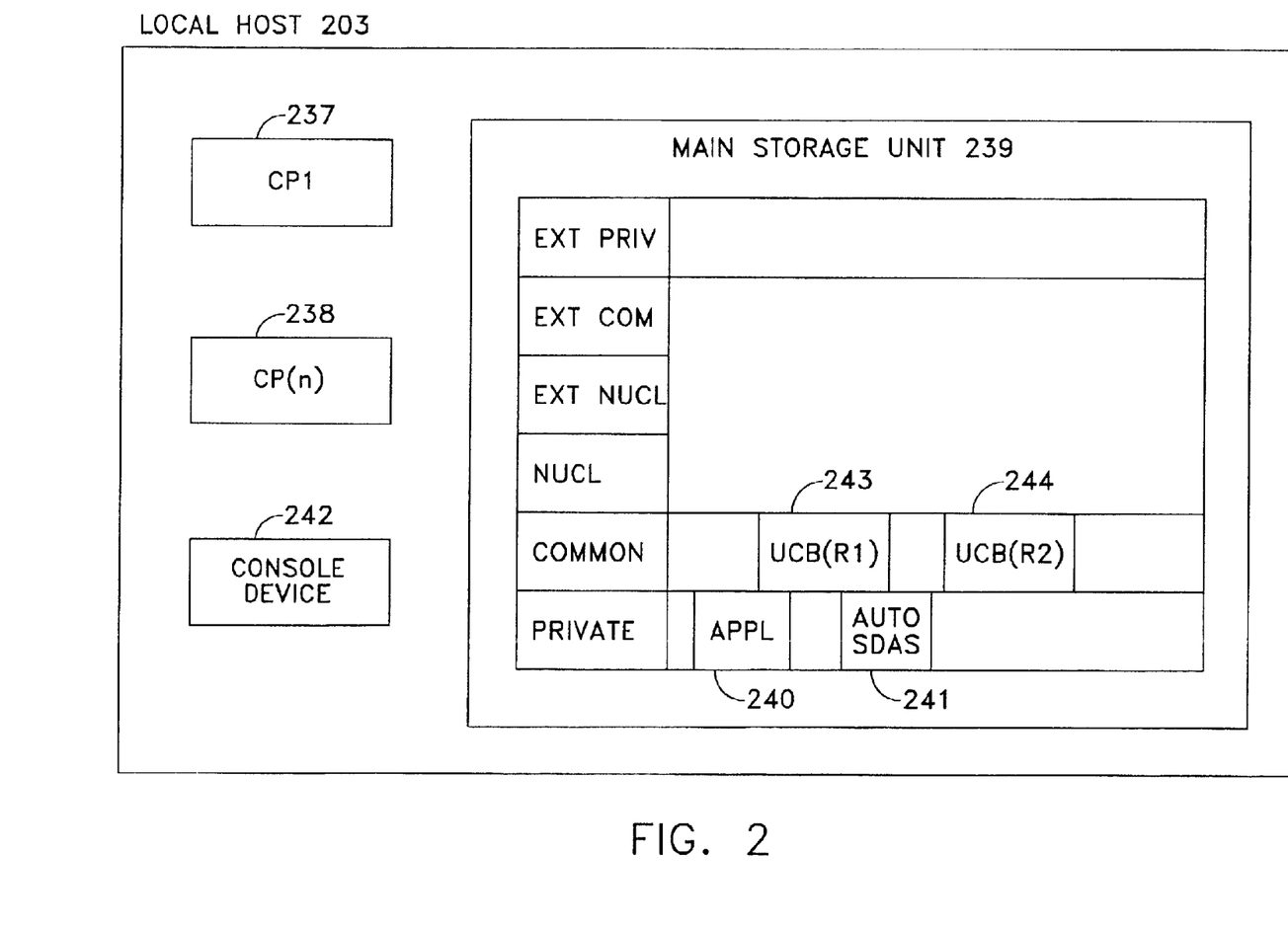
FIG. 2 is a view in more detailed depiction of a host with its processors, console and main storage unit.

The hosts 203 and 206 shown in FIG. 1 may operate with any commercially available operating system, such as the MVS operating system of International Business Machines Corporation. In an MVS environment, a host will include a plurality of CPs or central processors. By way of example, FIG. 2 depicts two central processors CP(1) and CP(n) associated with the local host 203 and identified by reference numerals 237 and 238, respectively. The remote host 206 normally will a similar structure. The CPs communicate with a main storage unit, such as a main storage unit 239 in the local host 203. As known, the main storage unit 239 is divided into a number of areas including common and private areas and extended common and extended private areas that store data and programs, or application, such as an APPL application 240 and an AUTO SDAS application 241 that implements this invention. A console device 242 permits an operator to communicate with the system for performing a number of configuration, diagnostic and other procedures independently of operations that occur in response to any application programs. As will become apparent, an operator can use the console device 242 to initiate switching in accordance with one aspect of this invention.

A control block, called a Unit Control Block (UCB) in the context of an MVS operating system, contains information about a logical volume (hereinafter a "logical device" ) and related status information. Two blocks are shown in FIG. 2; namely a UCB(R1) unit control block 243 and a UCB(R2) unit control block 244. The common address space will contain an additional unit control block corresponding to the UCB(R1) control block 243 for each logical device in the local host 203. It will also contain a unit control block (UCB) like the UCB(R2) control block 244 corresponding to each logical device associated with the remote host 206.

Figure 3:
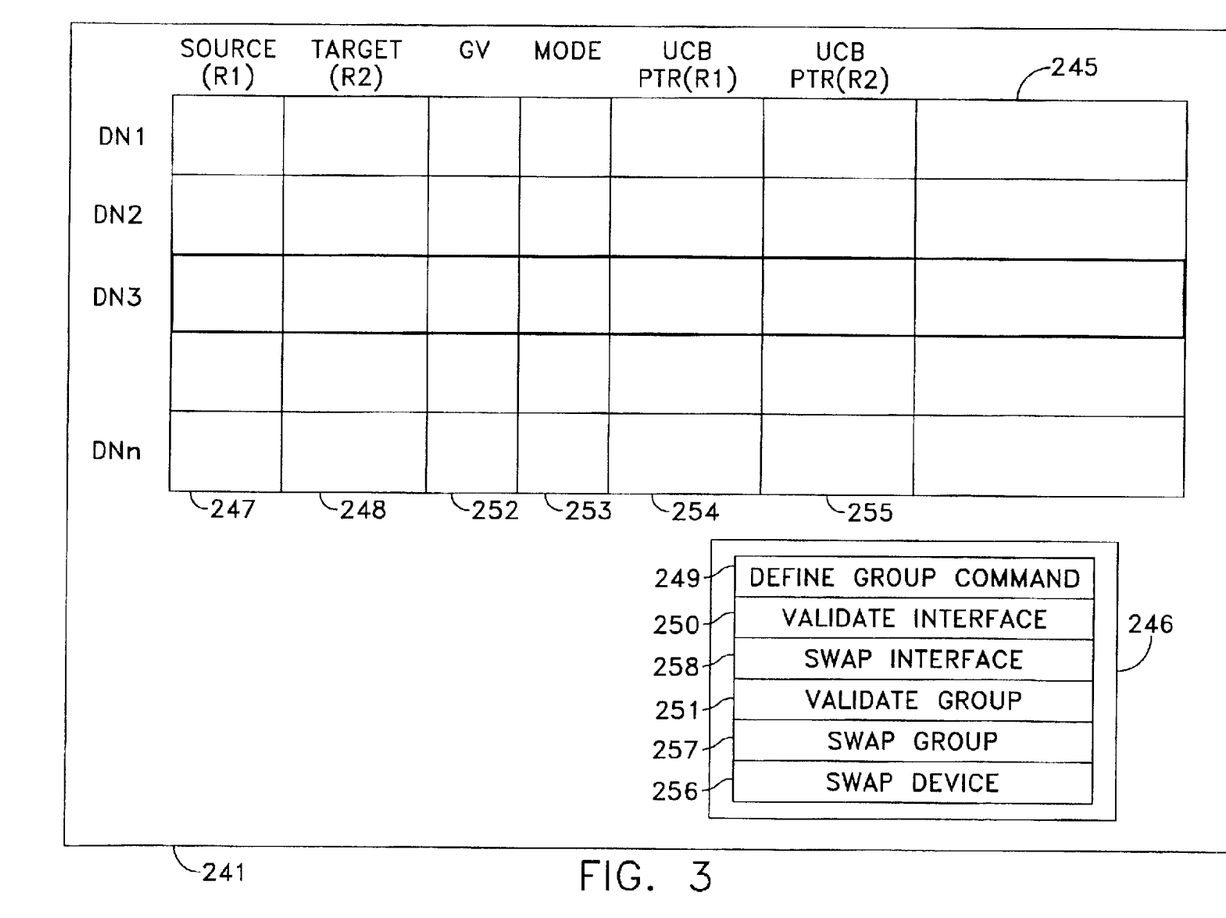
FIG. 3 is a detailed diagram of an address switching application that incorporates this invention.

When any application program, such as the AUTO SDAS application program 241, is loaded into a main storage unit, the MVS operating system provides an address space for that program. FIG. 3 represents a functional organization of the address space 241 assigned to the AUTO SDAS system. More specifically, the address space 241 comprises a data structure 245 and a block of program modules 246 that interact to provide the address switching in accordance with this invention.

A load and initialize module (not shown) establishes and loads the functional modules 241 into the address space 239. Such a module may also define a data structure, such as the data structure 245. FIG. 3 represents this data structure as a two-dimensional matrix in which each row represents a different logical device, designated as DN1, DN2, DN3 and DNn logical devices.

In the context of this invention, a logical device in the local system can be called a "source" or "R1" device. The corresponding logical device in the remote system is called a "target" or "R2" device. Each row in the data structure 245 identifies the internal device numbers for the corresponding source and target logical devices at columns 247 and 248.

A define group module 249 establishes the source and target entries for each logical device that operates as a group. If multiple groups exist, multiple instantiations of the data structure 245 will exist.

A validate interface module 250 provides alternate ways to initiate a process for validating a number of characteristics of the defined group prior to any attempt to make a swap. A validate group module 251 performs the validation. It indicates that valid conditions exist with respect to each source and corresponding target. A GV flag 252 in the data structure 245 represents the outcome of the validation process. In normal operations a system 200 as shown in FIG. 1, may operate in different modes. A mode field 250 specifies the operating mode between each source and its corresponding target. Columns 254 and 255 contain pointers to the UCBs for the source and target logical devices, such as the UCB(R1) and UCB(R2) unit control blocks.

A swap device module 256 performs a swapping operation for a particular device. If, for example, the DN1 logical device is identified, the swap device module 256 exchanges the information in the corresponding UCB(R1) and UCB (R2) unit control blocks as identified by the information in the corresponding UCB PTR(R1) and UCB PTR(R2) pointers 245 and 255. A swap group module 257 enables all the logical devices in a group established by a Define_Group command module 249 to be switched. A swap interface module 258 presents alternate approaches for instituting the processes of swap group module 257 and/or swap device modules 256.

Dynamic Address Switching Validation

Figure 4:
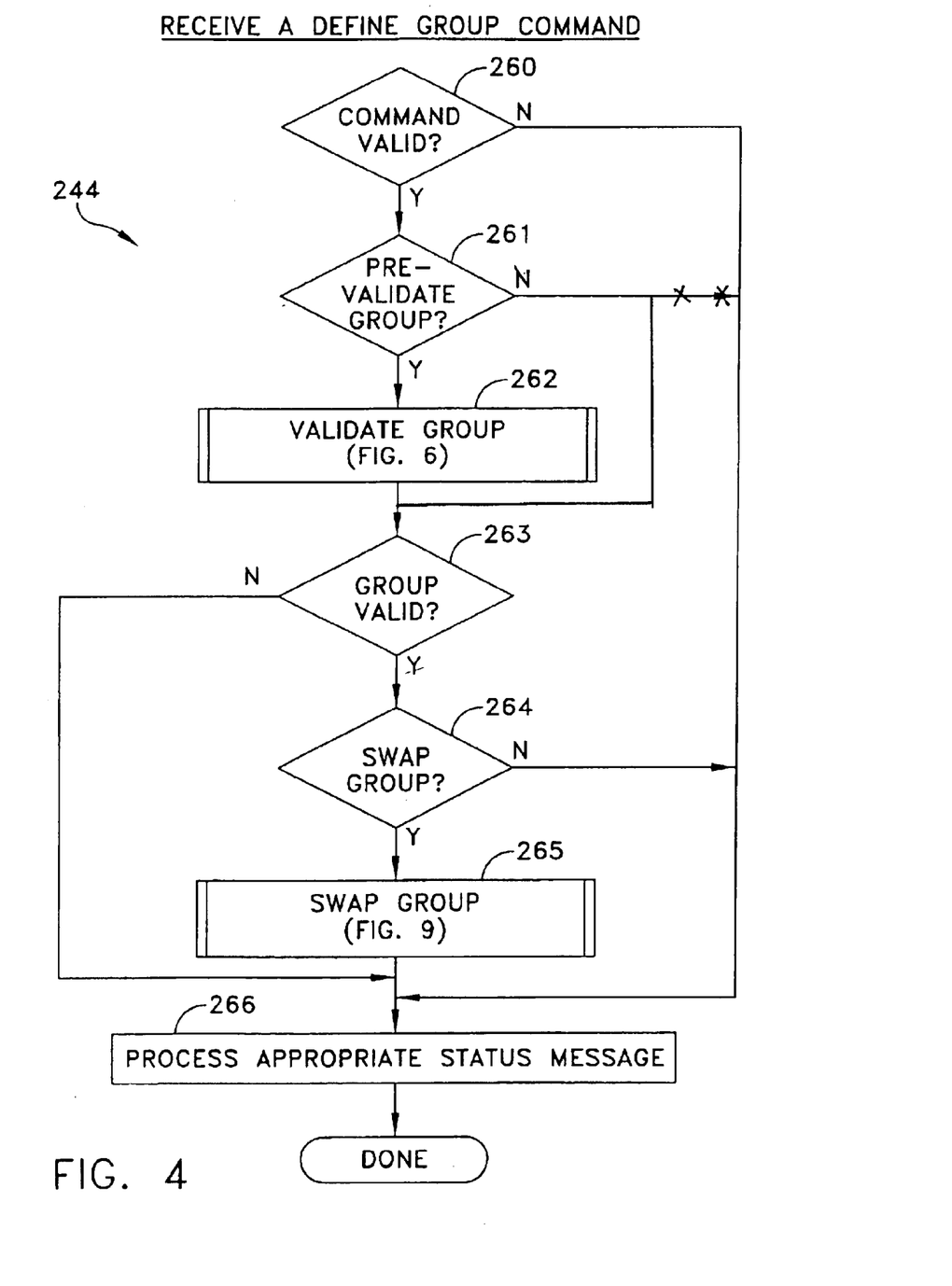
FIG. 4 is a flow chart that depicts a response to a Define_Group command initiating the address switching function including a validate group process and an address switching process.

FIG. 4 depicts an operation of one implementation of a Define_Group command module 244 that responds to a Define_Group command. A Define_Group command provides a group name and identifies each logical device to be included in the defined group. The logical device identification can take any number of conventional formats. The command also contains option arguments that determine whether a prevalidation will occur and whether all the logical devices in the group will undergo dynamic address switching. The command may include other arguments as will be described.

When a Define_Group command is received, step 260 performs various context, syntax and other tests to determine if the received Define_Group command has a valid format.

Figure 9:
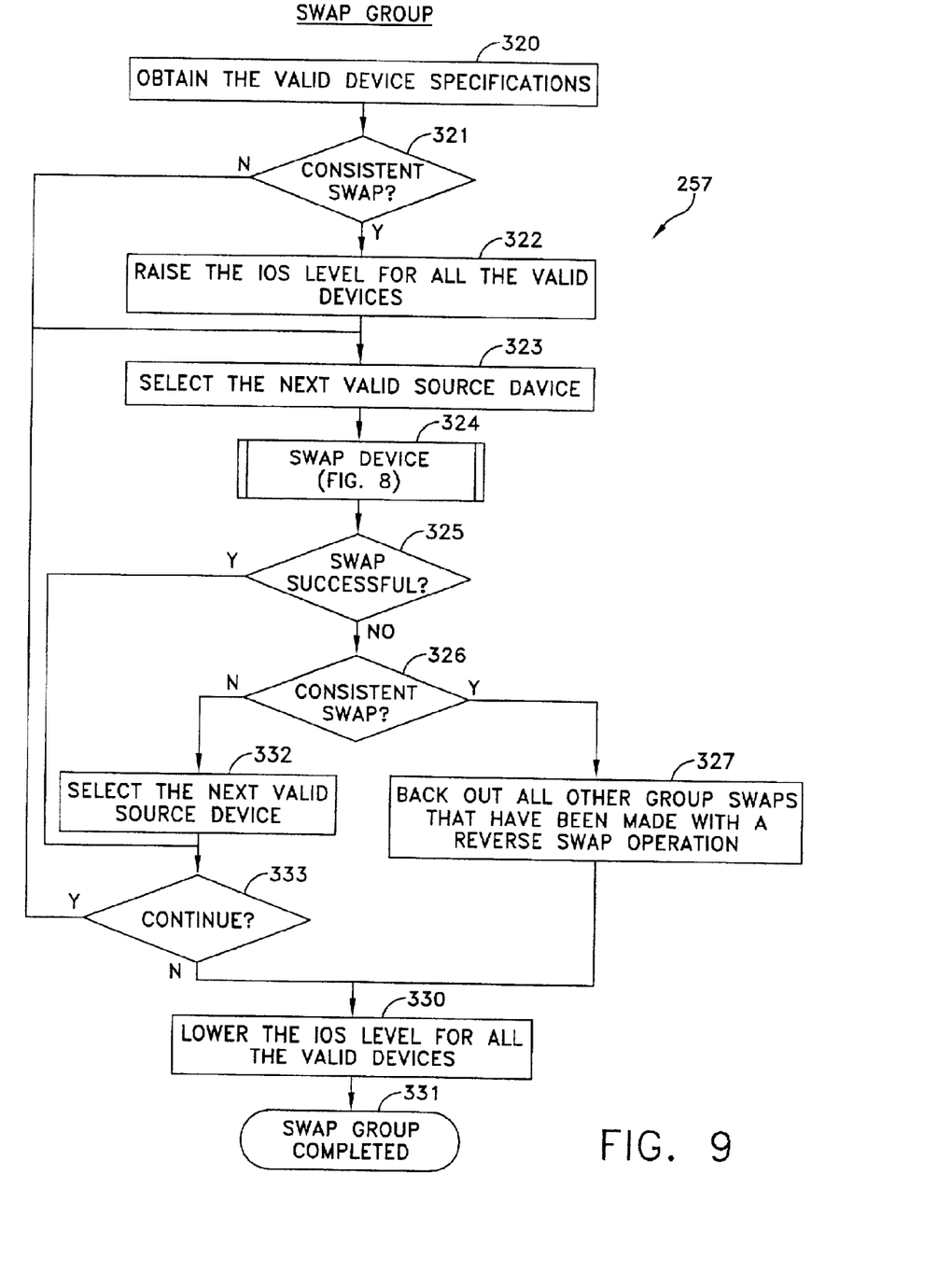
FIG. 9 depicts a flow chart for performing address switching with a group of logical devices.

Step 261 determines whether the Define_Group command arguments requested a validation procedure. If they do, step 262 calls a Validate Group process as described with respect to FIG. 6. The Validate Group process uses the information in the command and other sources, such as the RDF configuration files that are part of the system shown in FIG. 1, to generate information for the data structure 245. This information includes the previously described source and target identifications, group validity state, the operating mode and the pointers to each UCB. When the Validate Group process completes, control passes to step 263. If all the logical devices in the group and other related tests are valid, control passes to step 264. Step 264 determines whether the Define_Group command arguments request immediate dynamic address switching, or "swap". The "swap" can be limited to a single logical device or to all logical devices in a group. If a swap is defined for a group, step 264 transfers to step 265 that initiates the Swap Group module 257 in FIG. 3 as also shown in FIG. 9. When the Swap Group procedure is complete, control returns to FIG. 4 and particularly to step 266 that processes an appropriate status message for transfer back to the application program as known in the art. If the Define_Group Command were processed as just described, such a status message would indicate successful definition of the group and completion of the swap.

If the command is found to be invalid, step 260 transfers control directly to step 266 to produce an appropriate status message indicating that determination. If the Define_Group command validate group does not contain a validation argument, step 261 transfers control directly to step 263. This test might also be made as part of step 260. If step 263 determines that the group is invalid, control also transfers to step 266. If the Define_Group command does not include a swap argument, step 264 transfers directly to step 266 to generate the appropriate status message.

Figure 5:
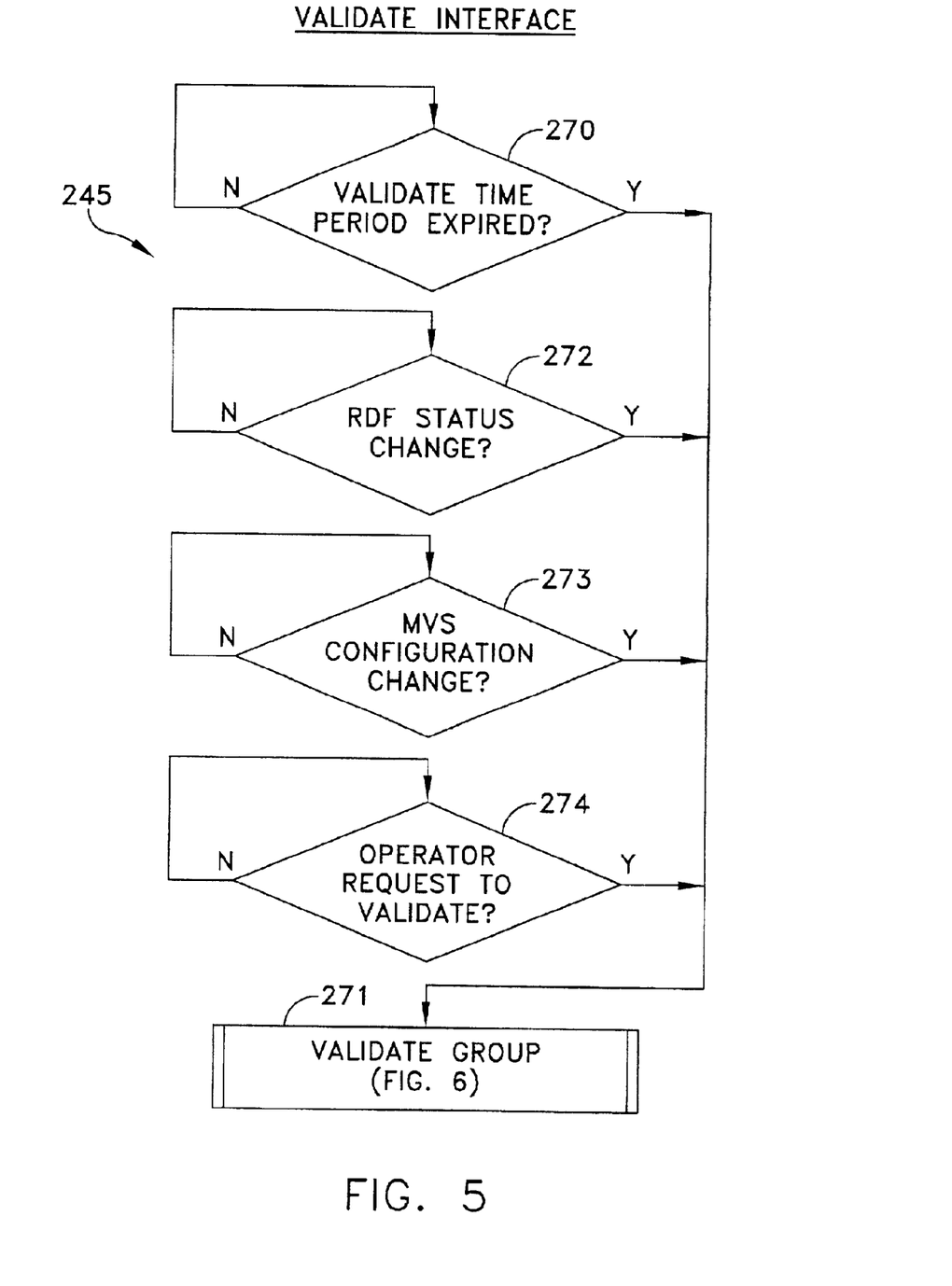
FIG. 5 is a flow chart that depicts other operations that can initialize the validate group process.

FIG. 4 uses step 262 to initiate a group validation. In accordance with another aspect of this invention, there are other ways to initiate a validation. Referring now to FIG. 5, the system operator may elect to have the validation module operate asynchronously on a repetitive basis in accordance with another argument in the Define_Group command. Step 270 represents a timing mechanism that would establish such repetitive operations of a call for the validate group process 271. The interval between successive calls could be measured in minutes, hours or longer.

A system operator could make a change to the RDF status by altering connections or relationships in the overall system shown in FIG. 1. Step 272 represents an interruption handler that invokes the validate group process. Step 273 represents an interrupt handler responsive to any configuration change introduced in the MVS operating system.

Step 274 indicates an operator request through the console or otherwise to validate the group at an any arbitrary time. The ability to validate at any arbitrary time, or "prevalidate", a group of logical devices during normal operations of the data processing system in FIG. 1 is important to this invention. This capability enables the dynamic address switching to swap information in the corresponding unit control blocks for a plurality of logical devices when a channel fails or when certain errors exist in a data storage facility.

Figure 6:
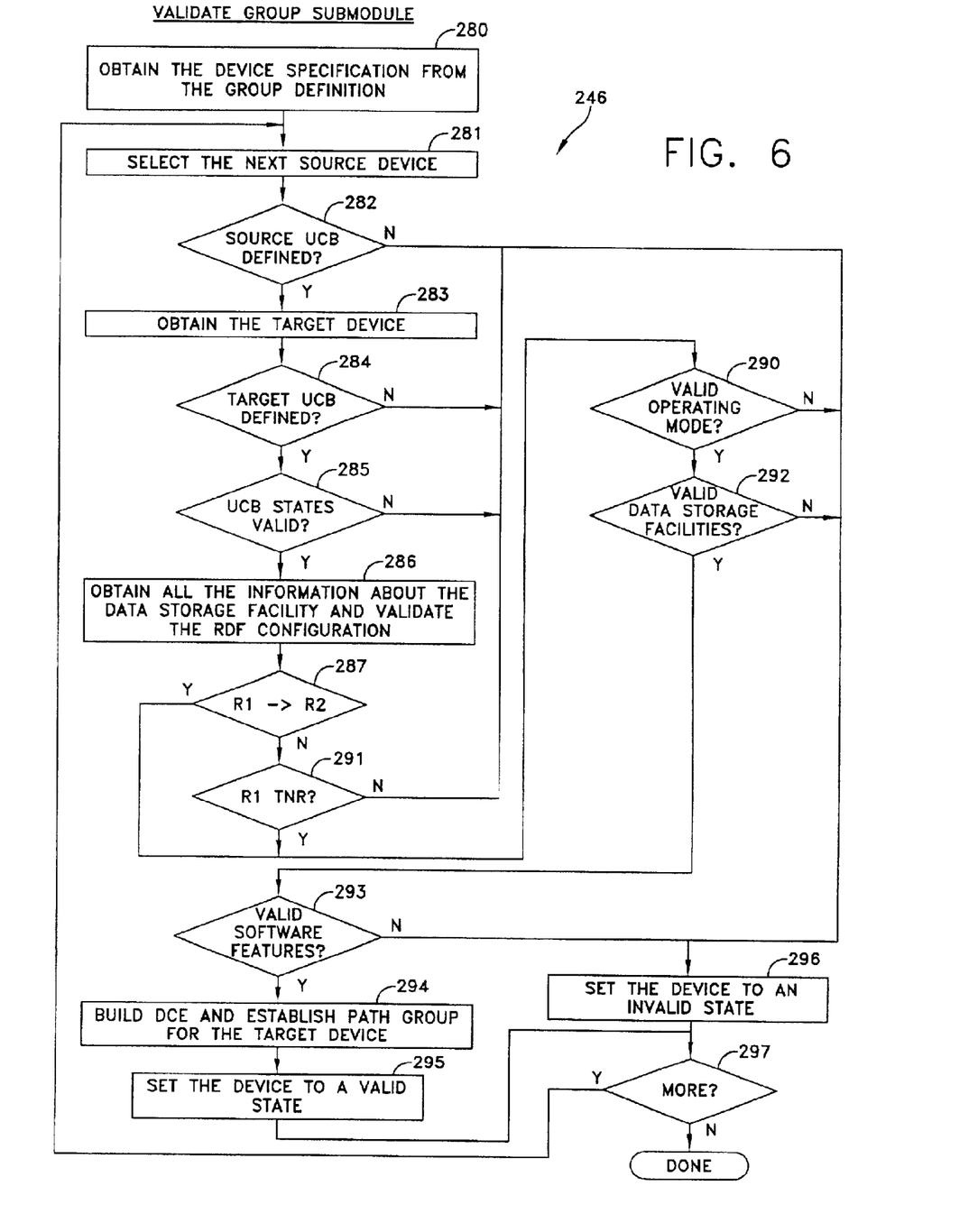
FIG. 6 is a flow chart of the validate group process.

A more detailed description of the validate process 246 is depicted in FIG. 6. Step 280 obtains a device specification from the group definition as contained in the data structure 245 shown in FIG. 3. Step 281 selects a next source device from the data structure 245. Step 282 transfers control to step 283 if the selected source UCB is defined. If it is, step 283 obtains the information about the corresponding target device. If the target UCB is defined, step 284 transfers control to step 285 to determine whether the UCB states are valid. This test, for example, assures that the corresponding UCBs exist at an MVS level and can assure that the source and target devices are on-line. Still other tests may be conducted. If both UCBs are valid, step 286 obtains information about the data storage facility and the RDF configuration. For example, step 287 determines whether the validation will be used for performing dynamic address switching from the local system 201 to the remote system 202 in FIG. 1 or the reverse as would occur when it was possible to redirect I/O requests to the local data storage facility 204. If the former condition exists, control passes to step 290. Otherwise step 291 determines whether the R1 device as a target device for this dynamic address switching operation is ready. Other tests might also be used. If the R1 device is not ready, control transfers to step 290.

Step 290 utilizes the information in the mode field 253 of FIG. 3 to determine whether the system is in a valid operating mode. Systems such as the system in FIG. 1 can operate in a number of different modes. One definition of a valid operating mode is a mode during which each write operation must wait until the remote data storage facility 207 acknowledges the receipt of a write request in its system memory 222 before the local data facility 204 returns any acknowledgement to the local host 203 in FIG. 1 indicating completion of the write operation.

Assuming that the logical volumes are to operate in such a mode, control transfers to step 292 in FIG. 6 that assures that both data storage facilities are valid and are operating properly and that corresponding source and target devices are compatible. Step 293 determines whether any software features are installed that might conflict with an address switching operation. If all these tests are completed satisfactorily, the validate group procedure builds a device control extension (DCE) and establishes a path group to the target device in step 294. This path group extends to the R2 logical device in the remote data storage facility in the case of a dynamic address switch from a logical device in the local data storage facility 204. For a reverse dynamic address switching operation, the target device is the logical device in the local data storage facility 204.

After completing this process in step 294, step 295 sets the device to a valid state by setting the corresponding GV flag 252 for the specific logical device. If any of the foregoing tests fail, control transfers to step 296 that sets the corresponding GV flag 252 to an invalid state.

Once this process is completed for a specific source device, control passes to step 297. If more source devices exist, control then transfers back to step 281. The process of FIG. 6 repeats until all the source devices identified in the data structure 245 in FIG. 3 are processed whereupon the validation group process terminates.

When the process of FIG. 6 is finished, the GV flags 252 represent the outcome of the validating process. More specifically, each of the GV flags 252 indicates whether, after a previous validating procedure initiated by any of the means shown in FIGS. 4 and 5, a particular set of source and target devices have a valid relationship.

Dynamic Address Switching

Figure 7:
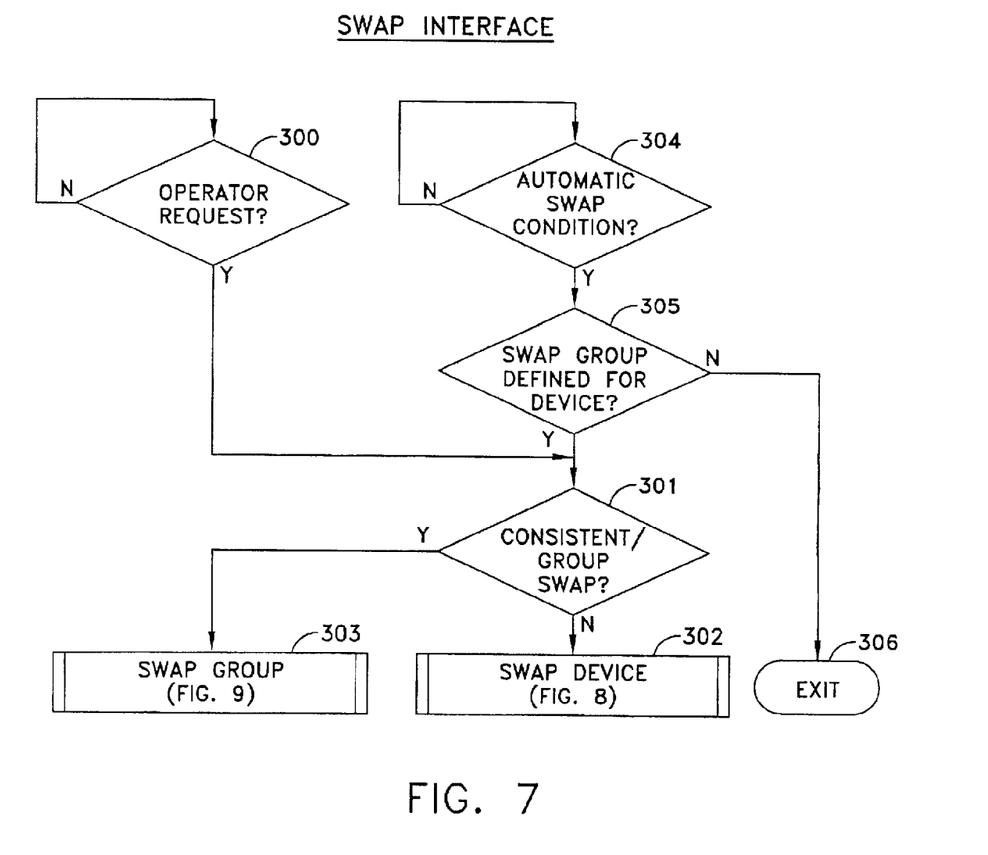
FIG. 7 is a flow chart that depicts various processes for initiating the address switching process in accordance with this invention.

FIG. 4 also defines a swap group process at step 265 that actively produces the dynamic address switching. Like the validate group process in FIG. 6, there are different ways to initiate swapping operations. Referring to FIG. 7, step 300 represents an operator request for a swap that occurs at some arbitrary time and relies upon a prior prevalidation. For example, if a system error occurs, an operator's appropriate response might be to force a swap. When a such a request is received, control transfers to step 301. Step 301 calls the swap device process in FIG. 8 through step 302 if the swap is either a single device swap or a non-consistent group swap. Otherwise step 303 calls the swap group process of FIG. 9.

In accordance with another aspect of this invention, a monitoring system can respond to certain error conditions. A channel failure, for example, might be detected if a host directed I/O request to a logical device in the local data storage facility 204 over the channel 205 is not returned within a predetermined time interval. Another error might be reported by a unit check conducted in response to an interrupted transfer to a logical storage device in the local data storage facility 204. If any of these or other predetermined conditions exist, step 304 can respond and transfer control to step 305 that determines whether the received command defines a swap group. If no group is defined, there can be no response and the process exits at step 306. If a group is defined, control transfers to step 301 to initiate a swap device or swap group procedure depending on the need for a consistent swap.

Figure 8:
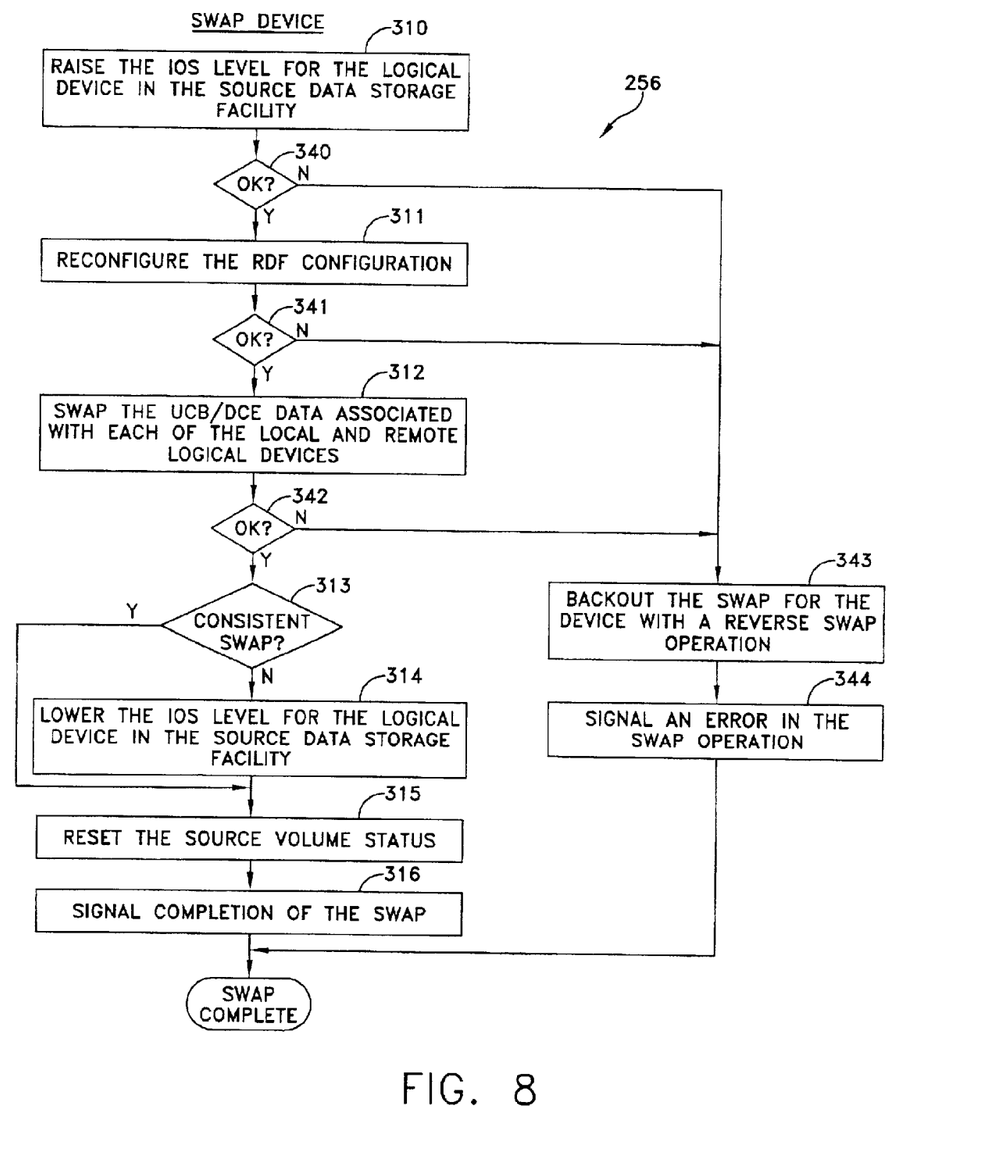
FIG. 8 depicts a flow chart for performing address switching with a single logical device.

FIG. 8 depicts the swap device to conventional I/O requests procedure 256. Step 310 raises the IOS level to block access to the identified source and target devices. For example, if the local host communicates with the local data storage facility 204 over the channel 205, the IOS level would be raised for the specific logical device in the local data storage facility 204 before switching the address to direct I/O requests over the channel 233. If that operation is successful, step 340 transfers control to step 311.

Step 311 then alters the RDF configuration to reflect the upcoming change. For example, the RDF configuration would be modified to indicate that the source device is no longer effectively connected over the link 232. If that operation is successful, step 341 transfers control to step 312.

Step 312 swaps or exchanges the information in the corresponding UCBs defined by the pointers 243 and 244 in FIG. 3. If that operation is successful, step 342 transfers control to step 313.

If a group of logical devices is being swapped, an election can be made to swap them with or without consistency. When a swap involves only a single logical device, "consistency" does not apply. By default, step 313 transfers control to step 314. Step 314 lowers the IOS level for the identified source data storage facility and releases the block to I/O request access. When this occurs subsequent I/O requests are directed in accordance with the information in the UCB(R1) 243 shown in FIG. 2 that now points to a logical device in the remote data storage facility 207. Step 315 resets the source volume status in compliance with operating system requirements. Step 316 then signals the completion of the swapping operation and the operation is complete. If the swap device procedure 256 was called from step 302 in FIG. 7, then the procedure in FIG. 7 is complete.

If any of the operations in steps 310 through 312 are not successful, control transfers to step 343. Step 343 backs out the swap operation and returns the source and target devices to their respective states existing prior to the swapping operation. Step 344 then produces an error message for a failed address switching operation for the select source and target devices.

FIG. 7 may call the swap group procedure 257 in step 303. Referring to FIG. 9, step 320 obtains valid device specifications based upon information in various locations including the corresponding UCBs for each of the devices in the group. If a command requesting the swap group procedure 257 includes a Consistent Swap argument, address switching for all the devices in the group should occur essentially simultaneously. For a consistent operation, step 321 transfers to step 322 to raise the IOS levels for all the valid logical devices that are included in the defined group. Otherwise control then transfers to step 323. Likewise step 321 transfers control directly to step 323.

If no consistency is required, step 323 selects a particular valid source device based on the information in data structure list 245 of FIG. 3. Step 324 then calls the swap device procedure 256 in FIG. 8. This produces the swap for the selected device. However, if a consistent swap is underway, step 313 prevents step 314 from lowering the IOS level for the selected logical device.

If the swap is successful, step 325 returns control to step 333 to select a next valid source device. This process will repeat until the information for each set of UCBs has been exchanged. If the swap for a selected source device is not successful, step 325 transfers to step 326. If a consistent swap operation is underway, step 326 transfers control to step 327 that terminates the swapping operation and performs a reverse swapping operation to return all previously swapped source and target devices to their status prior to the beginning of the consistent address switching operation. When this has been completed, step 330 lowers the IOS level for all the valid devices. If the operation does not involve a consistent swap, step 332 merely selects a next valid source device. If such a device is available, step 333 transfers control back to step 323 to select a next valid device. When all the address switching is completed for the group by exchanging UCB information, the swap group procedure completes by lowering the IOS levels in step 330. When this occurs after a successful procedure, I/O hosts are directed to the mirror devices such as logical devices in the remote data storage facility over a new channel.

EXAMPLES

With this background an even fuller understanding may be obtained by referring to some specific examples. Assume that data processing system shown in FIG. 1 includes two logical devices at the local site identified by names "Doug" and "Paul" and it is desired to handle these at a group that is arbitrarily called "Patent". Further assume that the logical device named "Doug" resides in a physical storage device 214 with a device number "d". Assume that the logical device named "Paul" is located in one of the physical storage devices 216 as a logical device "p".

During normal operations of the configuration of FIG. 1, each time the local host issues an I/O request identifying "Doug", the MVS operating system utilizes information in the unit control block like the UCB 243 in FIG. 2 to direct the request to the logical device DN=d. At the same time because the configuration in FIG. 1 requires a remote data facility configuration, the data is transferred across the link 232 to be located in a compatible logical device DN=x in physical storage devices 224. Similarly, an I/O request generating a write operation to logical device "Paul", will change the corresponding location in the Dn=p logical device in physical storage devices 216 and the corresponding Dn=y compatible logical device in physical storage devices 226.

With this configuration assume that there is a need to perform a load balancing operation or to perform some maintenance on each of the "Doug" and "Paul" logical devices. In this situation the operator can enter a Define_Group command for a group called "Patent" with a requirement for validation and swapping. The process in FIG. 4 responds as previously described. As this command defines a group, the process called by step 265 raises the IOS levels for the "Paul" and "Doug" logical volumes temporarily blocking any interaction between these logical devices and any other application. Then the information in the UCB for the DN=p and the UCB for the DN=y logical devices interchanges. Similarly the information for the UCB for DN=d and the UCB for the DN=x logical devices interchanges. The process then lowers the IOS level and performs any necessary housekeeping. The next I/O request for the logical device "Doug" then transfers to the DN=x storage device; and the next I/O request to logical device "Paul" to the DN=y storage device.

When the maintenance or load balancing functions are complete, another dynamic address switching operation can restore the system. The process is the same as previously described. More specifically, the Define_Group command will validate the group. Then the swap group will run in the same manner and will now exchange the information in the various unit control blocks so each of the unit control blocks resumes its original state. Thus the UCB for the DN=p logical device will receive data from the UCB for the DN=x logical device. Thereafter the I/O requests to the "Doug" and "Paul" logical devices will be routed to the DN=p and DN=d logical devices in the physical disk drives 214 and 216, respectively.

When the validate process of FIG. 6 operates asynchronously to a swap command, as periodically or intermittently in response to changed conditions, it is possible to utilize the swap group and swap device procedures for responding to a channel failure or a logical data storage facility failure. Typically if a channel fails the MVS operating system generates a time out error. If a failure occurs within the local data storage facility, a unit check or other error acknowledgement and message are received by the MVS operating system. An interrupt handler can then be used, as shown in FIG. 7, to establish, in steps 304 and 305, either a consistent or a non-consistent swap. The generation of such a swap command has the format of the Define_Group command but without a validation procedure call. That is, the validity of the operation will depend upon a prior validation procedure as recorded in the GV table 252 in FIG. 3. If a channel fails, the interrupt handler can define a group comprising all the logical devices that access the failed channel. If failures occur and the I/O request being processed is associated with other logical devices, the interrupt handler can generate a command that lists all the associated logical devices in that group. In either case, the interrupt handler can automatically redirect the failed I/O request and subsequent I/O requests to any logical device in the group over the alternate channel to backup or target logical devices based upon a prior indication of validity. As an alternative, the interrupt handler might send a message to the system operator who could initiate the corresponding address switching manually through the console.

In summary, there has been disclosed a method and apparatus for enhancing the operations with redundant storage devices involving dynamic address switching. The use of a swap group allows a single command to perform dynamic address switching of multiple logical volumes. This facilitates the swapping operations associated with maintenance and load balancing. Such commands also will enable a validation to occur to assure that the swapping does not corrupt data. I/O requests can be redirected to a secondary to target logical devices on a consistent basis. Allowing the validate group procedure to run asynchronously with respect to any error events enables a swap group command to make appropriate transfers without having to do a validation. This allows the swap group to respond to different errors.

This invention has been disclosed in terms of a specific embodiment. It will be apparent that many variations and modifications can occur. For example, the dynamic address switching has all been defined in terms of the local host 203 in FIG. 1. The process is equally applicable to enabling the remote host 206 to swap and redirect I/O operations to the local data storage facility over the channel 235 and the host adapter 236 in appropriate configurations. FIGS. 4 through 9 depict specific steps and step sequences for providing the dynamic address switching. These steps and sequences are for explanation only. It will be obvious that other steps and other sequences could be substituted. It will also be apparent to those of ordinary skill in the art that the specifically disclosed embodiment is readily adaptable to other systems including other main frame structures. Therefore, it is the intent of the appended claims to cover all such variations and modifications as come within the true spirit and scope of this invention.

What is claimed as new and desired to be secured by Letters Patent of the United States is:

1. A method for enabling a processor that directs I/O requests over a first communications channel to a first plurality of logical devices during normal operations to switch and direct I/O requests over a second channel to a second plurality of logical devices normally operating as a mirror of the first plurality of logical devices and each of the plurality of logical devices has an identifying control block, I/O requests normally being processed using control blocks for the first plurality of logical devices, said method being responsive to a swap command to direct I/O requests to an identified logical device over the second channel and comprising the steps of:

A) determining, during normal operations, an operating validity of both the first and second pluralities of logical devices, and B) performing an address switch by:

i) verifying the operating validity of the logical devices in the first and second pluralities of logical devices corresponding to the identified logical device based upon the step of determining operating validity during normal operations, and ii) in response to a successful verification, blocking I/O requests to the identified logical device to enable the exchange of the information in each control block associated with the logical devices corresponding to the identified logical device in the first and second pluralities of logical devices, said blocking being terminated after the exchange whereby subsequent processor I/O requests to the identified logical device are directed to the corresponding logical device in the second plurality of logical devices.

2. A method as recited in claim 1 wherein said determination of operating validity of the first and second pluralities of logical devices occurs asynchronously and independently of said exchange of control block information for the identified logical device.

3. A method as recited in claim 2 wherein said determination of operating validity of the first and second pluralities of logical devices is made periodically prior to said performing of said address switch with the identified logical device.

4. A method as recited in claim 2 wherein the processor and logical devices can operate with different configurations and wherein said determination of operating validity occurs in response to a change in a configuration.

5. A method as recited in claim 2 wherein the processor and logical devices can operate in different operating modes, and wherein said determination of operating validity occurs in response to a selected operating mode of the process with the first plurality of logical devices.

6. A method as recited in claim 2 wherein said determination includes a determination of operating validity for each of the first plurality of logical devices and the corresponding logical device in the second plurality of logical devices.

7. A method as recited in claim 6 wherein a data structure includes a validity flag for each of the first plurality of logical devices and its corresponding one of the second plurality of logical devices and wherein said determination of operating validity sets the corresponding validity flag.

8. A method as recited in claim 7 wherein the swap command identifies at least one logical device and said blocking of I/O requests occurs with respect all of the identified logical devices in the first plurality of logical devices during the exchange of information unblocking occuring after all the exchanges are made whereby the redirection of processor I/O requests to the second plurality of logical devices occur essentially simultaneously thereby to produce a consistent transfer.

9. A method as recited in claim 7 wherein said exchange includes, for each identified logical device, the steps of:
   i) selecting a single logical device in the first plurality of logical devices,
   ii) blocking access to the selected logical device,
   iii) and thereafter exchanging the information in each control block associated with the selected logical device and the corresponding logical device in the second plurality of logical devices; and
   iv) unblocking access to the selected logical device.

10. Apparatus for enabling a processor that directs I/O requests over a first communications channel to a first plurality of logical devices and to switch and direct I/O requests over a second channel to a second plurality of logical devices normally operating as a mirror of the first plurality of logical devices in response to a swap command that identifies a logical device in the first plurality of logical devices wherein each of the plurality of logical devices has an identifying control block and the processor I/O requests normally are processed using control blocks for the first plurality of logical devices, said apparatus comprising:
   A) means for determining, during normal operations, an operating validity of the first and second pluralities of logical devices,
   B) means for initiating an address switch including:
      i) means for verifying the operating validity of the logical devices in the first and second pluralities of logical devices corresponding to the identified logical device, and
      ii) means responsive to the verification for blocking I/O requests to the identified logical device to enable the exchange of the information in each control block associated with the logical devices in the first and second pluralities of logical devices corresponding to the identified logical device, said blocking being terminated when the exchange is complete whereby subsequent processor I/O requests with the identified logical device are directed to the corresponding logical device in the second plurality of logical devices.

11. Apparatus as recited in claim 10 additionally comprising means for activating said determination means asynchronously and independently of the operation of said exchange means.

12. Apparatus as recited in claim 11 additionally comprising means for activating said determination periodically prior to the operation of said address switching means.

13. Apparatus as recited in claim 11 wherein the processor and logical devices can operate with different configurations and wherein said apparatus additionally comprises means for activating said determination means in response to a configuration change.

14. Apparatus as recited in claim 11 wherein the processor and logical devices can operate in different operating modes, and wherein said apparatus additionally comprises means for activating said determination means in response to a selected operating mode of the process with the first plurality of logical devices.

15. Apparatus as recited in claim 11 wherein said determination means includes means for determining the validity for each of the first plurality of logical devices and the corresponding logical device in the second plurality of logical devices.

16. Apparatus as recited in claim 15 additionally comprising a data structure including a validity flag for each of the first plurality of logical devices and its corresponding one of the second plurality of logical devices, said determination means sets the corresponding validity flag if valid operating conditions exist.

17. Apparatus as recited in claim 16 wherein the swap command identifies at least one logical device, said apparatus additionally comprising means for blocking access to all the identified logical devices before the information exchanges and means for releasing said blocking means after all the exchanges are made whereby the redirection of processor I/O requests to the second plurality of logical devices occur essentially simultaneously and consistently.

18. Apparatus as recited in claim 16 wherein said exchange means includes:
   i) means for selecting a single logical device in the first plurality of logical devices,
   ii) means for blocking access to selected logical device, said exchange means being activated in response to said blocking means, and
   iii) means for releasing said unblocking means.

* * * * *

UNITED STATES PATENT AND TRADEMARK OFFICE
CERTIFICATE OF CORRECTION

PATENT NO.     : 6,874,046 B1                                                Page 1 of 1
DATED          : March 29, 2005
INVENTOR(S)    : Douglas E. LeCrone et al.

It is certified that error appears in the above-identified patent and that said Letters Patent is hereby corrected as shown below:

Drawings
FIG. 4, Reroute the "N" output from step 261 to step 263, rather than step 266
FIG. 9, Block 323 delete "DAVICE" and insert -- DEVICE --

Signed and Sealed this

Twenty-first Day of June, 2005

JON W. DUDAS
*Director of the United States Patent and Trademark Office*